(12) United States Patent
Imamichi et al.

(10) Patent No.: US 6,551,694 B1
(45) Date of Patent: Apr. 22, 2003

(54) THERMOSETTING RESIN DECORATIVE BOARD AND METHOD OF PRODUCING THE SAME

(75) Inventors: Kaori Imamichi, Tokyo (JP); Satoshi Nagasawa, Tokyo (JP); Kouji Moriuchi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 13 days.

(21) Appl. No.: 09/708,445

(22) Filed: Nov. 9, 2000

(30) Foreign Application Priority Data

Nov. 12, 1999 (JP) ............................................ 11-322418
Jan. 12, 2000 (JP) ........................................ 2000-003334

(51) Int. Cl.⁷ ................................................ B32B 3/00
(52) U.S. Cl. ................... 428/195; 428/213; 428/320.2; 428/322.2; 428/339
(58) Field of Search ........................... 428/322.2, 195, 428/213, 339, 320.2, 446

(56) References Cited

U.S. PATENT DOCUMENTS 5,019,202 A * 5/1991 Kawahata et al. .......... 156/277

FOREIGN PATENT DOCUMENTS

| JP | A 47-14273 | 8/1972 | |
|----|------------|--------|----------|
| JP | A 53-10677 | 9/1978 | B32B/31/12 |
| JP | A 54-120663 | 9/1979 | B29C/23/00 |
| JP | A 1-35637 | 5/1989 | B32B/21/08 |
| JP | A 2-284677 | 11/1990 | B05D/3/06 |

* cited by examiner

Primary Examiner—Deborah Jones
Assistant Examiner—Ling Xu
(74) Attorney, Agent, or Firm—Staas & Halsey LLP

(57) ABSTRACT

An ordinary pattern and a liquid repellent pattern are formed on the base paper. The base paper is then impregnated with a thermosetting resin having a characteristic of being repelled by the liquid repellent pattern. A covering layer of the impregnated resin is formed by the thermosetting resin which has not been impregnated into the base paper and remains on the surface of the base paper. As the thermosetting resin for impregnation is repelled by the liquid repellent pattern, the covering layer of the impregnated resin is not formed on the liquid repellent pattern. The covering layer of the impregnated resin is formed so as to be thicker than the liquid repellent pattern. Due to this, a recessed portion is created at the portion where the liquid repellent pattern is formed.

10 Claims, 4 Drawing Sheets

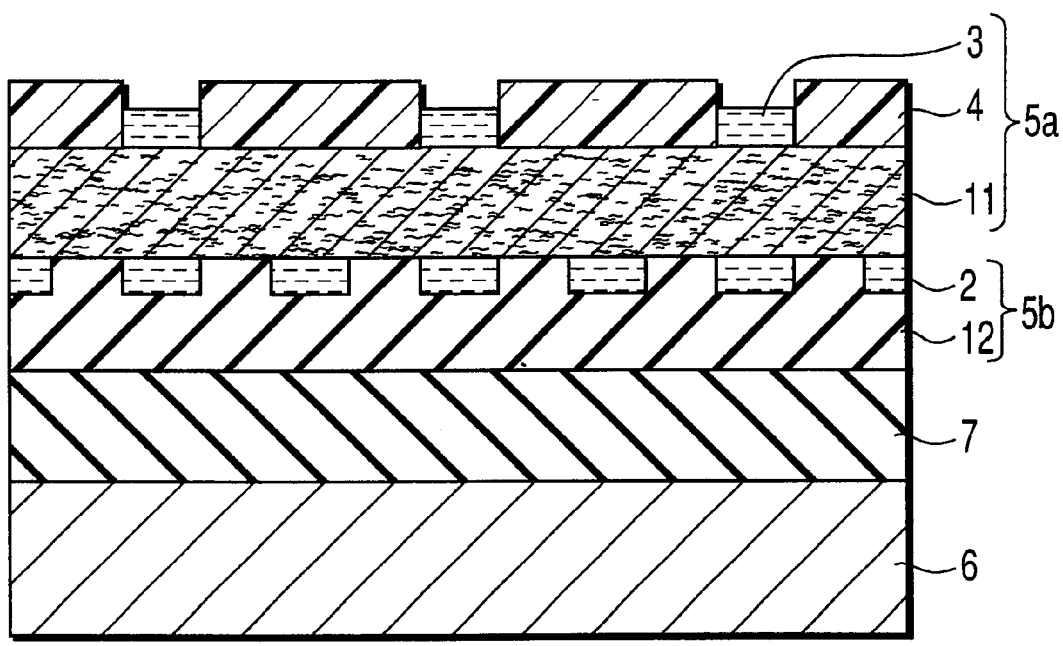
F I G. 3
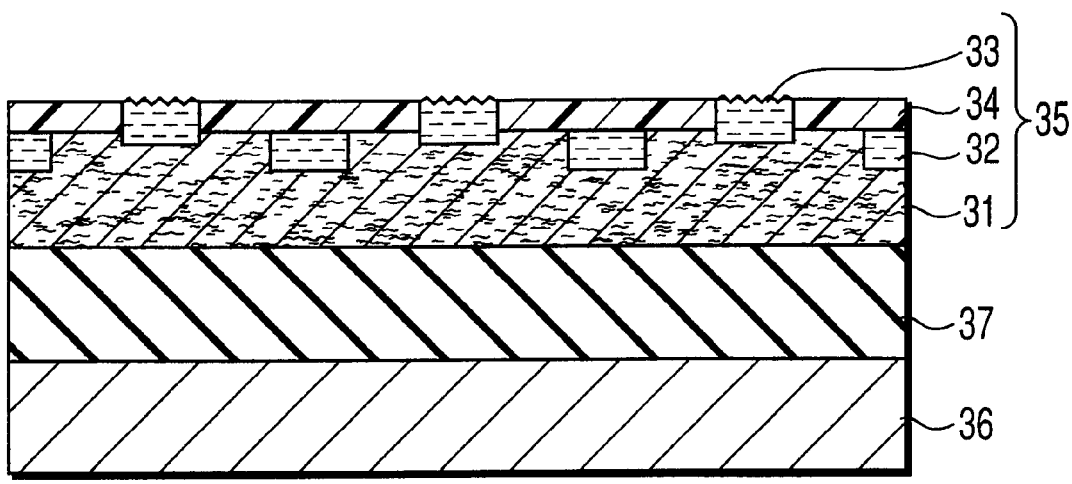
F I G. 4

THERMOSETTING RESIN DECORATIVE BOARD AND METHOD OF PRODUCING THE SAME

CROSS-REFERENCE TO RELATED APPLICATIONS

This application is based upon and claims the benefit of priority from the prior Japanese Patent Applications No. 11-322418, filed Nov. 12, 1999; and No. 2000-003334, filed Jan. 12, 2000, the entire contents of which are incorporated herein by reference.

BACKGROUND OF THE INVENTION

The present invention relates to a thermosetting resin decorative board which is used as a surface material of furniture, containers and the like or as an interior/exterior decorative material of architecture, vehicles and the like, and also relates to a method of producing the same thermosetting resin decorative board.

Conventionally, thermosetting resin decorative boards such as a melamine decorative board are widely used for various applications as described above. In order to produce a thermosetting resin decorative board, in general, a desired design pattern like wood grain pattern is at first printed on the surface of base paper having excellent water-absorbing properties (such as titania-containing paper). This product is impregnated with a thermosetting resin such as melamine resin, so as to produce patterned paper impregnated with a thermosetting resin. A sheet of core paper (produced by impregnating base paper such as kraft paper with a thermosetting resin such as phenol resin) is set on a substrate like plywood, and the pattern paper is set on the core paper. An overlay paper (produced by impregnating base paper having a characteristic of becoming transparent when impregnated with a resin, with a thermosetting resin such as a melamine resin) may be set on the patterned paper, if necessary. By hot-pressing the resulting product, a thermosetting resin decorative board is obtained.

During the hot-pressing process described above, a metal plate having a mirror-like or a desired texture-like surface is generally set on the overlay paper or the patterned paper impregnated with the thermosetting resin, so that the surface of the produced decorative board eventually has a predetermined finished state such as a mirror-like or a desired texture-like state. The method of forming raised (in relief)/recessed (concave) portions on the surface of a decorative board in such a manner is called the mechanical embossing method (refer to Japanese Patent Publication (KOKAI) No. 47-14273).

However, when a thermosetting resin decorative board having a texture-like surface is produced by the mechanical embossing method, a considerable number of the metal plates have to be prepared (the number of the metal plates must correspond to the number of types of texture to be produced), thereby significantly increasing the production cost. In addition, according to the mechanical embossing method, there arises a problem that it is extremely difficult to align (or correspond) the texture of the decorative board surface with the design pattern on the surface of the base paper.

As a non-mechanical embossing method in which the texture of the decorative board surface can be easily aligned with the design pattern, a chemical embossing method has also been developed. The chemical embossing method is characterized in that a printing ink containing a chemical substance called a curing inhibitor having an effect of delaying the curing reaction of the impregnated thermosetting resin is used as at least a portion of the printing ink for forming the design pattern (the "portion" of the printing ink may be a part of a pattern or a part of the colors in a case of multi-color printing). By using a printing ink which contains the curing inhibitor, curing of the thermosetting resin at the portions printed by the printing ink can be delayed during the hot-pressing process. Thereafter, by removing the resin remaining uncured after the hot-pressing process, recessed portions are formed (refer to Japanese Patent Publication (KOKAI) No. 53-110677).

The chemical embossing method has advantages that the alignment of the texture with the design pattern is easy and a single mirror-surface plate allows formation of any desired texture. However, in this method, the operation of removing the resin remaining uncured and the operation of cleaning the mirror-surface plate to which the uncured resin adhere are quite complicated, thereby reducing the productivity. Further, a specific chemical substance (ink) is required. Accordingly, significant reduction of the production cost is still difficult to achieve in the chemical embossing method.

As yet another embossing method, there has been proposed a method of forming recessed portions by inserting a transfer sheet having a transfer layer of liquid repellent patterns formed by a liquid repellent ink between the mirror-surface plate and the thermosetting resin impregnated paper, during the hot-pressing process of the thermosetting resin decorative board; transferring the liquid repellent patterns onto the product surface, simultaneous with the hot-pressing process; coating the whole surface with a transparent paint; and letting the transparent paint being repelled by the liquid repellent patterns, thereby forming recessed portions (refer to Japanese Patent Publication (KOKAI) No. 2-284677).

However, the thermosetting resin used for the production of such a thermosetting resin decorative board is generally selected from hard resins having a relatively high cross-linking density, in consideration of the strict requirement of particular physical properties, and thus the surface of the resin after the hot-pressing and curing process exhibits significantly poor adherency with other resins. Therefore, there arises a problem that close and reliable adhesion of the thermosetting resin surface with the transparent paint coated after the hot-pressing process is difficult to achieve and thus a thermosetting resin decorative board having excellent surface physical properties is hardly obtained.

Further, as a method for expressing a texture without creating the raised/recessed portion such as emboss, there has been proposed a method in which mat patterns, formed by a mat ink which contains a matting agent, is provided as at least a portion of the design patterns to be print-formed on the surface of the base paper (the "portion" of the printing ink may be a part of a pattern or a part of the colors in a case of multi-color printing) (Japanese Patent Publication (KOKAI) No. 54-120663).

This method has advantages that a single mirror-surface plate can deal with various types of texture; and decorative boards having different texture (texture is varied by changing the pattern and/or the lusterlessness of the mat ink) can be easily and efficiently produced at a low production cost without having a problem of uncured resin or the like. When a decorative board is actually produced by this method, mat patterns having a sufficient mat effect can be formed at the time of printing to the base paper. However, the mat ink is then planished due to a high pressure during the hot-pressing process and apparent raised/recessed portions on the surface are reduced, thereby not allowing the produced decorative board to have a satisfactory (or expected) texture appearance.

Therefore, in order to suppress the deterioration of gloss-mat effect by the hot-pressing process, several measures have been taken. For example, a hard particles having a relatively large diameter (2 or 3 to 90 μm or so) is used as the matting agent blended in the mat ink. Or, the hot-pressing is carried out after sufficiently curing the mat patterns by using a curable resin as the binder of the mat ink (Japanese Patent Publication (KOKAI) No. 1-135637). However, these measures have not necessarily achieved sufficiently excellent results. The inventors of the present invention have studied in detail the reason why such measures failed to achieve good results and discovered that, during the hot-pressing, the uncured thermosetting resin which melts due to the heat bleeds out of the base paper, enters between the mirror-surface plate and the mat pattern, forms a film on the mat pattern, resulting in that the film covers the mat pattern and reduces its gloss-mat effect.

BRIEF SUMMARY OF THE INVENTION

Accordingly, it is an object of the present invention to provide a thermosetting resin decorative board which has recessed portions aligned with design patterns and thus is excellent in designing.

Another object of the present invention is to provide a thermosetting resin decorative board having mat patterns provided on the surface of the thermosetting resin-impregnated sheet, the mat effect of the mat pattern being not reduced by the hot-pressing process, thereby achieving an excellent texture appearance due to sufficient gloss-mat differences.

A related object of the present invention is to provide a method of producing a thermosetting resin decorative board, by which a thermosetting resin decorative board which has recessed portions aligned with a design pattern and thus is excellent in designing can be easily and efficiently produced at a low production cost.

A further object of the present invention is to provide a method of producing a thermosetting resin decorative board in which the mat effect of the mat patterns is not reduced by the hot-pressing process and thus an excellent texture appearance due to sufficient gloss-mat differences is achieved.

According to a thermosetting resin decorative board of the present invention, a liquid repellent pattern and a covering layer of the impregnated resin are provided on the surface of the thermosetting resin-impregnated sheet and the covering layer of the impregnated resin is thicker than the liquid repellent pattern.

According to another thermosetting resin decorative board of the present invention, a mat pattern having liquid repellency and a covering layer of the impregnated resin having gloss are provided on the surface of the thermosetting resin-impregnated sheet.

A method of producing a thermosetting resin decorative board according to the present invention, comprises the steps of forming a liquid repellent pattern on a surface of base paper having excellent water absorbing properties; impregnating the base paper with a thermosetting resin which is repelled by the liquid repellent pattern, thereby forming a covering layer of the impregnated resin, on the base paper, at the portions other than the portions where the liquid repellent pattern is formed, such that the covering layer of the impregnated resin is thicker than the liquid repellent pattern; obtaining resin-impregnated pattern sheet in which a recessed portion is created at the portion of the liquid repellent pattern; setting the resin-impregnated pattern sheet on a substrate; and hot-pressing the product, while maintaining configuration of the recessed portion.

Another method of producing a thermosetting resin decorative board according to the present invention, comprising the steps of providing a mat pattern having liquid repellency on a base paper having excellent water absorbing properties; impregnating the base paper with a thermosetting resin which is repelled by the liquid repellent mat pattern, thereby producing a resin-impregnated pattern sheet in which a covering layer of the impregnated resin is formed, on the base paper, at the portions other than the portions where the liquid repellent mat pattern is formed; and hot-pressing the resin-impregnated pattern sheet.

Additional objects and advantages of the present invention will be set forth in the following description, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a side sectional view showing a second embodiment of a thermosetting resin decorative board of the present invention;

FIG. 4 is a side sectional view showing a third embodiment of a thermosetting resin decorative board of the present invention;

DETAILED DESCRIPTION OF THE INVENTION

A preferred embodiment of a thermosetting resin decorative board according to the present invention will now be described with reference to the accompanying drawings.

First Embodiment

Figure 1:
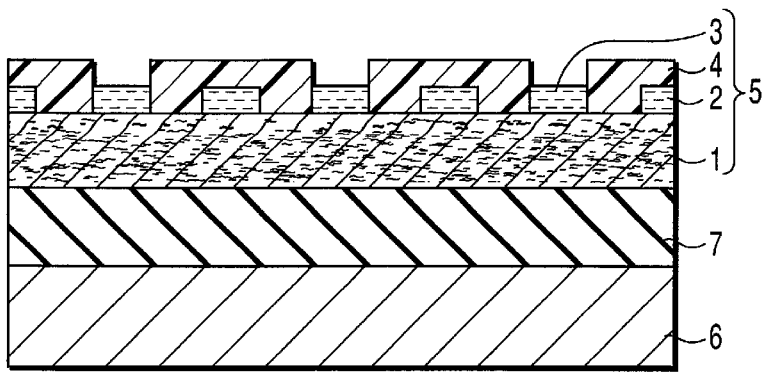
FIG. 1 is a side sectional view showing a first embodiment of a thermosetting resin decorative board according to the present invention.

FIG. 1 is a side sectional view showing a structure of a first embodiment.

A thermosetting resin decorative board according to the first embodiment of the present invention is structured by laminating a resin-impregnated patterned paper 5, which has been impregnated with a thermosetting resin and cured, on a substrate 6. The resin-impregnated patterned paper 5 has a liquid repellent pattern 3 on the surface of the base paper 1 and also has, on the base paper 1, at the portions other than the portions where the liquid repellent pattern 3 is formed, a covering layer 4 of the impregnated resin formed by the residual of the impregnated thermosetting resin remaining on the surface of the base paper 1. The covering layer 4 of the impregnated resin is formed so as to have thicker film thickness than the liquid repellent pattern 3. Due to this, the portion at which the liquid repellent pattern 3 is provided creates a recessed portion which is recessed as compared with the other surface portion (i.e., the surface of the covering layer 4 of the impregnated resin).

On the surface of the base paper 1 which constitutes the resin-impregnated patterned paper 5, a pattern 2 formed by an ordinary printing ink or the like which does not have liquid repellency (which will be referred to as "ordinary pattern" hereinafter) may be formed, if necessary, in addition to the liquid repellent pattern 3. Further, an adhesive layer (not shown) or core paper 7 made of a thermosetting resin-impregnated paper 7 may be sandwiched between the resin-impregnated patterned paper 5 and the substrate 6.

Figure 2A:
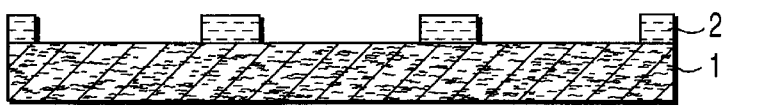
FIGS. 2A, 2B, 2C, 2D, and 2E are views showing production processes according to the first embodiment of the thermosetting resin decorative board of the present invention.
Figure 2B:
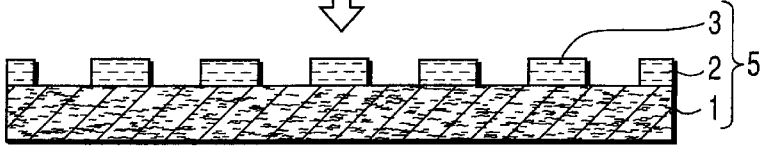
Figure 2C:
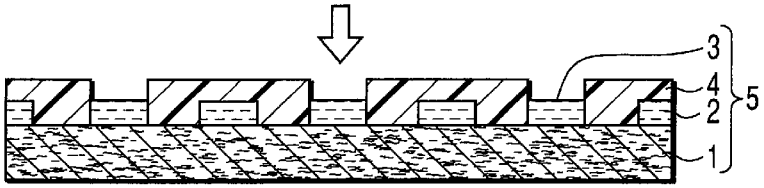

The production process of the thermosetting resin decorative board of the first embodiment is shown in FIGS. 2A–2E. First, as shown in FIG. 2A, the ordinary pattern 2 is formed, if necessary, on the surface of the base paper 1 having excellent water absorbing properties. Thereafter, as shown in FIG. 2B, the liquid repellent pattern 3 is formed on the surface of the base paper 1. Then, as shown in FIG. 2C, the base paper 1 is impregnated with the thermosetting resin having a characteristic of being repelled by the liquid repellent pattern 3, so that the covering layer 4 of the impregnated resin is formed by the portion of the thermosetting resin, which has not been absorbed by the base paper 1 but remains on the surface of the base paper 1. Here, as the thermosetting resin for impregnation is repelled by the liquid repellent pattern 3 on the surface of the base paper 1, the covering layer 4 of the impregnated resin is not formed on the liquid repellent pattern 3. Further, the covering layer 4 of the impregnated resin is formed to be thicker than the liquid repellent pattern 3. As a result, the recessed portion is created at the portion where the liquid repellent pattern 3 is provided. That is, the resin-impregnated patterned paper 5 is formed by the base paper 1, the ordinary pattern 2, the liquid repellent pattern 3, and the covering layer 4 of the impregnated resin.

Figure 2D:
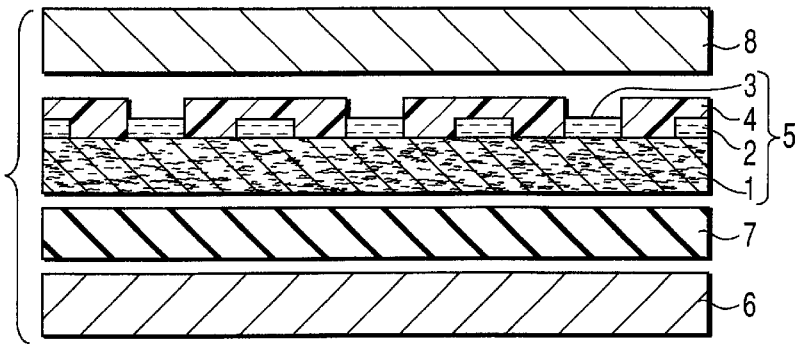
Figure 2E:
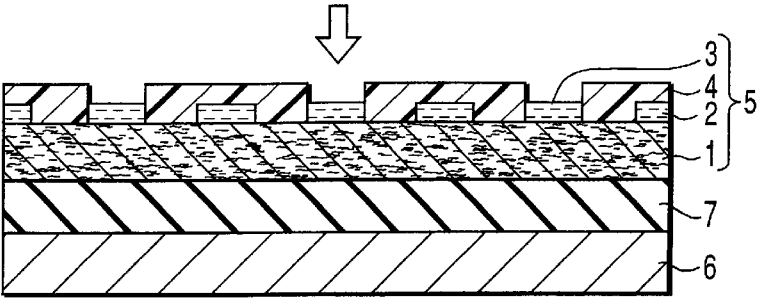

Next, as shown in FIG. 2D, the resin-impregnated patterned paper 5 obtained as described above is set on the substrate 6, with the core paper 7 made of the thermosetting resin-impregnated paper being sandwiched between the resin-impregnated patterned paper 5 and the substrate 6, if necessary, and the a metal plate (mirror-surface plate) 8 is attached on the surface of the resin-impregnated patterned paper 5, to perform hot-pressing. Then, it is now possible, as shown in FIG. 2E, that the thermosetting resin absorbed in the base paper 1 is cured and integrated with the substrate 6 and the core paper 7, to obtain a desired thermosetting resin decorative board.

In the aforementioned production process, the ordinary pattern 2 and the liquid repellent pattern 3 may be formed in the reversed order. However, in a case in which the liquid repellent pattern 3 is formed on the ordinary pattern 2 in an overlapped manner, the liquid repellent pattern 3 is to be formed after the formation of the ordinary pattern 2, as described above.

Next, each structural portion of the present embodiment will be described in detail hereinafter.

The base paper 1 may be a sheet of paper which exhibits such excellent water absorbing properties as to allow the base paper to be impregnated with the thermosetting resin afterwards. That is, the base paper 1 may be fibrous, sheet-like shaped paper or the like. Examples of the material which can be used as the base paper 1 include lightweight paper, titania-containing paper, wood free paper, bleached or unbleached kraft paper paper. Among them, titania-containing paper is the most preferable because titania-containing paper is excellent in both printability and resin-impregnation adaptability. When real-material-like appearance of the surface of the substrate 6 is to be especially emphasized, what is called "transparent paper" having a characteristics of becoming transparent when being impregnated with a resin may be used. The thickness of the base paper 1 is not particularly limited. In general, those having basis weight (substance) of 20 to 200 $g/m^2$ or so are preferably used.

The type of a design pattern of the ordinary pattern 2 and the liquid repellent pattern 3 is not particularly limited. A wood grain pattern, stone grain pattern, cloth-textured pattern, abstract pattern, geometrical pattern, letter, symbol and the like, or any combination of these patterns may be used as desired. The liquid repellent pattern 3 is formed at the portion to be expressed as the recessed portion in the desired design pattern. In the case of wood grain pattern, for example, the liquid repellent pattern 3 is formed at the portion which represent vessel pores.

The liquid repellent pattern 3 may be colorless. However, it is preferable that the liquid repellent pattern 3 is a colored pattern, in terms of obtaining an effect of aligning the color pattern with the raised/recessed pattern. In addition, by bringing the liquid repellent pattern 3 into a mat state by adding a matting agent thereto, a thermosetting resin decorative board having excellent designing, in which the three-dimensional appearance is emphasized by the difference between the mat liquid repellent pattern 3 and the covering layer 4 of the impregnated resin, can be obtained.

The ordinary pattern 2 can be provided by ordinary printing methods in which an ordinary printing ink that does not have liquid repellency is used. The type of the printing ink is not particularly limited. However, a water-based ink is more preferably used in terms of the resin impregnating property, although an oil-based ink may be used, if desired. More specifically, an water-based ink exhibits more excellent affinity with the aqueous solution of the impregnated resin, as compared with the oil-based ink, and the resin can be impregnated rapidly and homogeneously in the impregnating process thereafter when an water-based ink is used. In addition, in the case of an water-based ink, excellent strength can also be realized because the impregnated resin is integrated with other materials.

The type of the water-based ink is not particularly limited. However, it is most preferable that the binder resin of the water-based ink contains, as main components, casein, emulsion resin and/or a latex resin. The binder resin of this type has a characteristic of becoming less dissolvable to water by experiencing the drying process after the ink is printed, and thus is less likely to re-dissolve into the aqueous solution of "the resin to be impregnated" in the resin impregnating process thereafter. In short, the binder of the aforementioned type is less likely to bring harmful damages on the design pattern or cause pollution of "the resin to be impregnated."

Examples of the emulsion resin include acryl-based, vinyl acetate-based, styrene-based, urethane-based resins. Examples of the latex resin include styrene-butadiene-based, acrilonitril-butadiene-based, methylmethacrylate-butadiene-based resins or the like.

In addition to the aforementioned casein, an emulsion resin and/or a latex resin, water-soluble polymers and the like including a water soluble resin such as polyvinyl alcohol; polysaccharides; and cellulose derivatives, may also be used so that the stability of the ink is increased.

The method of forming the ordinary pattern 2 is not particularly limited, and any printing methods including the gravure printing, the offset printing, the screen printing, the flexographic printing, the relief printing, the inkjet printing methods can be employed. Further, when an solid ink layer is provided for the purpose of primer coloring, as a method of forming the solid ink layer, any coating methods including the roll coating method, the gravure coating method, the rod coating method, the knife coating method, the air knife coating method, the spray coating method, the lip coating method, the die coating method methods can be employed.

The type of the ink used for forming the liquid repellent pattern 3 is not particularly limited. The ink for the liquid repellent pattern 3 may be the same type as or different from the printing ink used for the ordinary pattern 2. It is necessary that the printing ink for the liquid repellent pattern 3 contains a liquid repellent binder resin or an appropriate liquid repellent agent added thereto.

Examples of the liquid repellent binder resin include a silicone based resin or a fluorocarbon based resin. Substances having a relatively low surface tension including a paraffin such as polyethylene wax, an aliphatic acid or a derivative thereof, a metallic soap, a silicone based compound and a fluorocarbon based compound can be used, for example, as the liquid repellent agent. Among them, the liquid repellent agent containing the silicone base compound or the fluorocarbon based compound is the most excellent in terms of the liquid repellent effect.

The liquid repellent pattern 3 is a layer which is exposed on the surface without being protected by the covering layer 4 of the impregnated resin in the produced thermosetting resin decorative board. Therefore, in terms of mechanical and chemical surface properties of the decorative board, it is desirable that liquid repellent pattern 3 is formed by a printing ink which contains, as a binder, a curable resin such as a thermosetting resin or an ionizing radiation curable resin.

When the liquid repellent pattern 3 is brought into the mat state by adding the matting agent, in particular, forming the liquid repellent pattern 3 by the printing ink which contains as the binder a thermosetting resin is quite advantageous because the mat appearance is not likely to be lost by the effect of heat and pressure during the hot-pressing process and a decorative board which is excellent in three-dimensional appearance can be easily obtained.

Examples of such a curable resin include thermosetting resins such as melamine based, epoxy based, urea based, phenol based, unsaturated polyester based, diarylphthalate based, benzoguanamine based, urethane based, amino alkyd based and silicone based resins; and dissociation-radiation-induced curable resins such as (meth)acrylate based, unsaturated polyester based resins.

The type of the design pattern of the liquid repellent pattern 3 is not particularly limited. In other words, the design pattern of the liquid repellent pattern 3 may be aligned or may not be aligned with that of the ordinary pattern 2. However, in general, a thermosetting resin decorative board having more excellent design properties can be obtained by aligning the design pattern of the liquid repellent pattern 3 with that of the ordinary pattern 2. Further, when the dot percentage (area occupying ratio) of the liquid repellent pattern 3 is too high or the liquid repellent pattern 3 includes a peculiarly large area as the liquid repellent portion, some liquid repellent portion may not be able to repel liquid sufficiently, thereby resulting in insufficient formation of the recessed portion (i.e., the covering layer 4 of the impregnated resin could be formed at the portion where they should not be formed due to an insufficient liquid repellent effect. This means insufficient formation of the recessed portion). In such a case, it is effective to employ dot-like or thin line-like patterns (vessel pore-like patterns in a case of wood grain patterns), for example.

As the thermosetting resin to be used for impregnating the base paper 1 having the ordinary pattern 2 and the liquid repellent pattern 3 formed thereon, any of known thermosetting resins, which are conventionally used for production of a thermosetting resin decorative board, may be employed. Specific examples of such thermosetting resins include melamine based, epoxy based, diarylphthalate based, benzoguanamine based, urethane based, alkyd based, unsaturated polyester based, phenol based and urea based resins and the like. These thermosetting resins are used in the impregnation process with respect to the base paper 1, generally in a form of an aqueous impregnation solution in which the thermosetting resins are dissolved or dispersed in water.

In the impregnation process, the resins may be applied from the liquid repellent pattern 3 surface side of the base paper 1 (the ordinary pattern 2 and the liquid repellent pattern 3 have been formed thereon), or may be applied from the other surface side. Impregnating in two times with one time for each surface or impregnating the both surfaces simultaneously may also be acceptable. The ratio of impregnation of the thermosetting resin (the ratio of the weight of the impregnated resin with respect to the total weight of the base paper 1 after the impregnating process) is normally within a range of 20 to 80% or so, and is preferably within a range of 40 to 70% or so. Further, in order to obtain a thermosetting resin decorative board which is excellent in physical properties, it is important that the base paper 1 as a whole is homogeneously impregnated with the resin.

The internal strength o the base paper 1 is increased by the resin impregnating process described above. In addition, in a case in which the ordinary pattern 2 is provided, the ordinary pattern 2 and the base paper 1 are integrated with each other by this resin impregnating process. Further, a portion of the impregnated resin is not absorbed into the base paper 1 and remains on the surface of the base paper 1, thereby forming the covering layer 4 of the impregnated resin. More specifically, the portion where the liquid repellent pattern 3 is formed become the recessed portion because the covering layer 4 of the impregnated resin is repelled (and thus not formed thereon) by the liquid repellent pattern 3.

The resin-impregnated patterned paper 5 produced in such a manner is set on the substrate 6 and a metal plate (mirror-surface plate) is then set on the surface of the resin-impregnated patterned paper 5. By hot-pressing the resulting product, the thermosetting resin decorative board of the present invention can be obtained. In the case of the conventional mechanical embossing method, as raised/ recessed portion of the metal plate is mechanically, copied onto the surface of the decorative board, in the reversed manner, during the hot-pressing, a considerable number of the metal plates have to be prepared in advance (the number of the metal plates must correspond to the number of types of texture to be produced). However, in the present embodiment, as the raised/recessed portion is formed by the liquid repellent pattern 3, a single mirror-surface plate is enough as the metal plate, regardless of the types of the emboss treatment. The type of the substrate 6 to be used is not particularly limited. Any suitable material may be selected in accordance with the aimed application of the thermosetting resin decorative board. Examples of such materials include wooden substrates such as a veneer, a glued laminated timber, plywood, a particle board, a medium density fiberboard, a hardboard; fibrous substrates such as boardpaper, woven cloth, unwoven cloth, resin-impregnated paper, resin-impregnated cloth; inorganic substrates such as a plaster board, a slate board, a calcium silicate board, a slug plaster board, a cement excelsior board, a slug cement board, an aerated light-weight concrete board, a glass fiber-reinforced concrete board; metallic substrates such as a steel plate, a brass plate, an aluminum plate, a duralumin plate and a stainless-steel plate; synthetic resin substrates such as an acryl resin plate, a styrol resin plate, an ABS resin plate, a polycarbonate resin plate, a nylon resin plate, a polystyrene resin plate, a polypropylene resin plate, a polyester resin plate and a glass fiber-reinforced plastic plate. Two or more of the aforementioned materials may be combined so that they are used as a complex or a laminated body.

When the resin-impregnated patterned paper 5 is set on the substrate 6, the resin-impregnated patterned paper 5 and the substrate 6 may be laminated with each other by using an appropriate adhesive provided therebetween, if necessary. Alternatively, the resin-impregnated patterned paper 5 and the substrate 6 may be laminated with each other without using an adhesive or the like. Further, as in the conventional melamine resin decorative board, the resin-impregnated patterned paper 5 and the substrate 6 may be set in a laminated manner with the core paper 7 provided therebetween, if necessary.

The core paper 7 is produced by impregnating appropriate base paper such as titania-containing paper, bleached or unbleached kraft paper paper, unwoven cloth of glass fiber or the like with a thermosetting resin in the uncured state. Examples of such a thermosetting resin include melamine based, epoxy based, diarylphthalate based, benzoguanamine based, urethane based, alkyd based, unsaturated polyester based, phenol based and urea based resins and the like. Any of these thermosetting resins may be selected in accordance with the physical properties required with respect to the aimed thermosetting resin decorative board. Specific examples of the thermosetting resin include phenol resin-impregnated kraft paper and the like which is widely employed as core paper for the conventional melamine resin decorative board.

In the present embodiment, as one example of the hot-pressing method for laminating and adhering the substrate 6 with the resin-impregnated patterned paper 5 set thereon, a continuous laminate method of roll pressing type may be employed, in addition to the method in which the aforementioned metal plate (mirror-surface plate) 8 is attached to the resin-impregnated patterned paper 5 and a vertical pressing load is applied thereon. When the continuous laminate method using a metal endless belt is employed, in particular, a thermosetting resin decorative board of high quality (which has been densely cured/integrated with excellent adhering properties between the layers and does not have curling or waving on the surface thereof) can be advantageously produced continuously and at a high speed.

In the hot-pressing process, the surface configuration of the metal plate (mirror-surface plate) 8 or the metal endless belt is exactly copied, in the reversed manner, onto the surface of the covering layer 4 of the impregnated resin. Therefore, by using those having a polished surface which is flat and smooth like a mirror surface as the metal plate (mirror-surface plate) 8 or the metal endless belt, a thermosetting resin decorative board which is excellent in glossiness and smoothness of the surface thereof can be obtained.

Needless to say, by using the metal plate (mirror-surface plate) 8 or the metal endless belt whose surface has been mat or made to have texture as desired, it is possible to obtain a thermosetting resin decorative board having any desired state of surface finishing.

Next, a specific example of the first embodiment will be described herein after.

The liquid repellent pattern is formed by preparing titania-containing paper for decorative purposes having excellent water absorbing properties and a basis weight of 100 g/m$^2$; printing a wood grain pattern on the titania-containing paper, by using an water-based ink containing casein as a main component, according to the direct gravure printing method; and forming by printing, further "in-line" manner, the liquid repellent pattern so as to have a vessel pore pattern, according to the direct gravure printing method and using a curable-type urethane resin based ink which contains a silicone based liquid repellent agent added thereto, such that the vessel pore pattern is aligned with the wood grain pattern.

Thereafter, the product is dipped in an aqueous solution of melamine-based resin having a characteristic of being repelled by the liquid repellent patterns, so that the product is impregnated with the solution of melamine-based resin and the recessed portion are formed due to the resin being well repelled by the liquid repellent pattern and the covering layer of the impregnated resin not being formed on the liquid repellent pattern. The product is dried in a sufficient manner thereafter. During the aforementioned process, the impregnated amount of the resin is adjusted such that the basis weight of the resin-impregnated patterned paper after the impregnating and drying processes is 200 g/m$^2$.

The obtained resin-impregnated patterned paper is set on a substrate (aluminum plate) with core paper (phenol resin-impregnated kraft paper) interposed therebetween. A mirror-surface plate is then attached to the surface of the resin-impregnated patterned paper and a hot-pressing process is performed, so that the impregnated resin is cured and a thermosetting resin decorative board of the present embodiment is obtained.

As described above, in the present embodiment, a thermosetting resin decorative board which has, on the surface thereof, texture appearance due to the recessed portion aligned with the design pattern and thus is excellent in design properties can be easily and efficiently obtained at a relatively low production cost, without using specific, expensive chemicals nor experiencing complicated production processes.

Other embodiments of the present invention will be described hereinafter. The same reference numerals are designated to those which are similar to the first embodiment and detailed description thereof will be omitted.

Second Embodiment

According to the second embodiment shown in FIG. 3, in a sheet of the resin-impregnated patterned paper 5 of the first embodiment, the liquid repellent pattern 3 is first formed on a transparent paper 11 which is the base paper having a characteristic of becoming transparent by being impregnated with a resin. A thermosetting resin is applied for the impregnation process with respect to the transparent paper 11. The resin-impregnated patterned paper 5 is divided into surface resin-impregnated patterned paper 5a in which the covering layer 4 of the impregnated resin is formed so as to create the recessed portion on the liquid repellent pattern 3; and intermediate resin-impregnated patterned paper 5b in which the ordinary pattern 2 is formed on an ordinary base paper 12 and which has been impregnated with the thermosetting resin. The intermediate resin-impregnated patterned paper 5b and the surface resin-impregnated patterned paper 5a are sequently provided on the core paper 7 which is set on the substrate 6.

In the structure of the present embodiment, as the ordinary pattern 2 is separated from the liquid repellent pattern 3 by way of the transparent paper 11, the ordinary pattern 2 and the liquid repellent pattern 3 (more specifically, the positional relationship thereof with respect to the recessed portion) look different according to the height and angle at which a user sees the product. Therefore, in the present embodiment, a thermosetting resin decorative board having excellent thick appearance/appearance and three-dimensional appearance (that is, being excellent in design properties) can be obtained.

Third Embodiment

FIG. 4 is a side sectional view showing a thermosetting resin decorative board of a third embodiment of the present invention. FIGS. 5A–5E are side sectional views showing production processes of the thermosetting resin decorative board of the third embodiment.

The thermosetting resin decorative board of the present third embodiment is formed by laminating a resin-impregnated patterned paper 35, which has been impregnated with the thermosetting resin and cured, on a substrate 36. The resin-impregnated patterned paper 35 has liquid repellent mat pattern 33 on the surface of a base paper 31. A covering layer 34 of the impregnated resin is formed, on the base paper 31, at portion other than the portion where the liquid repellent mat pattern 33 is formed, by the residual of the thermosetting resin applied with respect to the base paper 31 remaining on the surface of the base paper 31, or by the thermosetting resin which is absorbed inside the base paper 31 but has melt and bleeds to the surface of the base paper 31 due to the high temperature during the hot-pressing process. Accordingly, in the thermosetting resin decorative board of the present embodiment, excellent texture and three-dimensional appearance are achieved by the difference in gloss between the surface of the covering layer 34 of the impregnated resin (glossy) and the surface of the liquid repellent mat pattern 33.

It should be noted that, on the surface of the base paper 31 constituting the resin-impregnated patterned paper 35, ordinary pattern 32 which does not have liquid repellency may be formed, if necessary, in addition to the liquid repellent mat pattern 33. The covering layer 34 of the impregnated resin is formed on the surface of the ordinary pattern 32, on the basis of the same principal of the surface of the base paper 31. An adhesive agent layer (not shown) or core paper 37 made of the thermosetting resin-impregnated paper may be provided between the resin-impregnated patterned paper 35 and the substrate 36, if necessary.

Figure 5A:
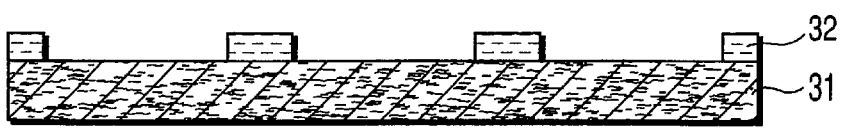
FIGS. 5A, 5B, 5C, 5D, and 5E are views showing production processes according to the third embodiment of the thermosetting resin decorative board of the present invention.
Figure 5B:
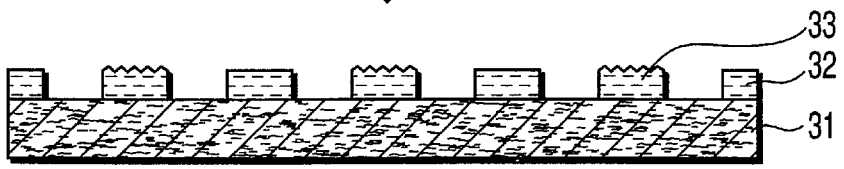
Figure 5C:
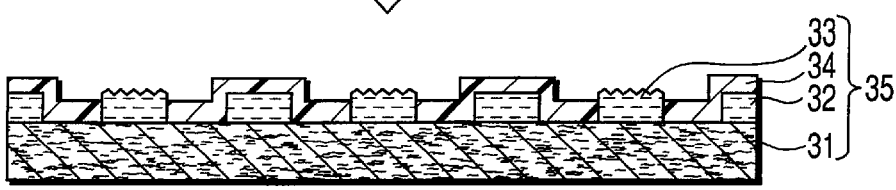

The production processes of the thermosetting resin decorative board of the fourth embodiment are shown in FIGS. 5A to 5E. First, as shown in FIG. 5A, the ordinary pattern 32 is formed on the surface of the base paper 31 having excellent water absorbing properties, if necessary. Thereafter, as shown in FIG. 5B, the liquid repellent mat pattern 33 is formed on the surface of the base paper 31. Then, as shown in FIG. 5C, the base paper 31 is impregnated with the thermosetting resin having a characteristic of being repelled by the liquid repellent mat pattern 33, so that the covering layer 34 of the impregnated resin is formed, on the base paper 31 surface, at the portions other than the portions where the liquid repellent mat pattern 33 is formed, by the thermosetting resin which has not been absorbed by the base paper 31 but remains on the surface of the base paper 31. As a result, the resin-impregnated patterned paper 35 is formed by the base paper 31, the ordinary pattern 32, the liquid repellent mat pattern 33, and the covering layer 34 of the impregnated resin.

Figure 5D:
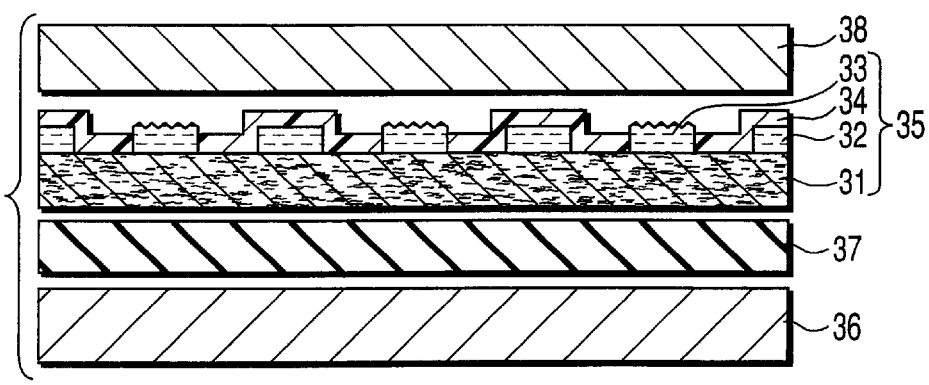
Figure 5E:
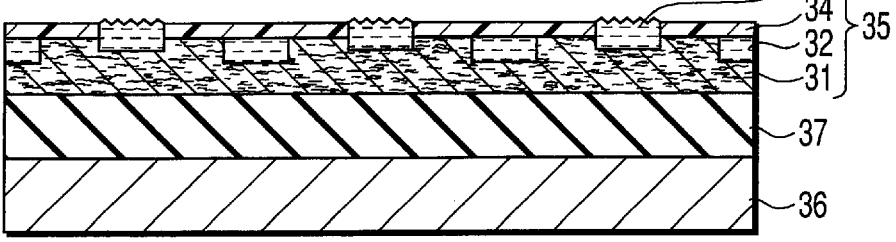

Next, as shown in FIG. 5D, the resin-impregnated patterned paper 35 obtained as described above is set on the substrate 36, with a core paper 37 made of the thermosetting resin-impregnated paper being interposed between the resin-impregnated patterned paper 35 and the substrate 36, if necessary. Then, a metal plate (mirror-surface plate) 8 is attached on the surface of the resin-impregnated patterned paper 35, to perform hot-pressing. As a result, as shown in FIG. 5E, the thermosetting resin absorbed in the base paper 31 is cured and integrated with the substrate 36 and the core paper 37. If the thermosetting resin, which has melted due to a high temperature, bleeds from the inside of the base paper 31 to the surface thereof, the molten thermosetting resin cannot enter the clearance between the liquid repellent mat pattern 33 and the metal plate (mirror-surface plate) 38 because the molten resin is repelled by the liquid repellent mat pattern 33. Accordingly, the covering layer 34 of the impregnated resin is not formed on the liquid repellent mat pattern 33, thereby preventing the raised/recessed portion of the surface of the mat pattern from being covered by the resin and reliably ensuring the mat appearance. By removing the product from the metal plate (mirror-surface plate) 38 after the product has been cured sufficiently, the aimed thermosetting resin decorative board can be obtained.

In the aforementioned production process, the ordinary pattern 32 and the liquid repellent mat pattern 33 may be formed in the reversed order. However, in a case in which the liquid repellent mat pattern 33 are formed on the ordinary pattern 32 in an overlapped manner, the liquid repellent mat pattern 33 are to be formed after the formation of the ordinary pattern 32, as described above.

The ordinary pattern 32 and the liquid repellent mat pattern 33 may be formed after the base paper 31 has been impregnated with the thermosetting resin. In this case, as is in the aforementioned case, the impregnated resin, which has been melted due to a high temperature and bled to the surface of the base paper 31 during the hot-pressing process thereafter, is repelled by the liquid repellent mat pattern 33 and thus the covering layer 34 of the impregnated resin are not formed on the liquid repellent mat pattern 33. On the other hand, the covering layer 34 of the impregnated resin is formed in the clearance between the metal plate (mirror-surface plate) 38 and the ordinary pattern 32 which does not have liquid repellency, by the resin which has bled from the surface of the base paper 31 around the ordinary pattern 32 or the resin which has bled out after permeating through the ordinary pattern 32. As a result, a thermosetting resin decorative board having a structure similar to that obtained by the aforementioned production processes can be produced.

However, if the liquid repellent mat pattern 33 is formed after the base paper 31 has been impregnated with the thermosetting resin, the liquid repellent mat pattern 33 will then be formed on the covering layer 34 of the impregnated resin which has already been formed on the surface of the base paper 31. In this case, sufficient adherency may not be obtained between the liquid repellent mat pattern 33 and the base paper 31, because the liquid repellent mat pattern 33 exhibits poor affinity with the impregnated resin. Accordingly, it is desirable that the liquid repellent mat pattern 33 is formed before the surface (the surface on which the liquid repellent mat pattern 33 is formed) of the base paper 31 is impregnated with the thermosetting resin or earlier.

As a principal, it is acceptable that the rear surface of the base paper 31 is impregnated with the resin before forming the liquid repellent mat pattern 33 on the front surface thereof and after the formation of the liquid repellent mat pattern the resin impregnation treatment is performed again from the front surface side. However, when the production process is to be simplified and the printing process is to be made easy as much as possible, it is most preferable that the liquid repellent mat pattern 33 is first formed on the surface of the base paper 31 which has not been impregnated with the resin and then the impregnating process by the thermosetting resin, which is repelled by the liquid repellent mat pattern 33, is performed.

As the details of each structural portion of the present embodiment are the same as those of the first embodiment, detailed description thereof will be omitted here. That is, the base paper 31, the ordinary pattern 32, the covering layer 34 of the impregnated resin, the substrate 36, and the core paper 37 are structured in a manner similar to the base paper 1, the ordinary pattern 2, the covering layer 4 of the impregnated resin, the substrate 6, and the core paper 7 of the first embodiment. The type of design pattern of the ordinary pattern 32 and the liquid repellent mat pattern 33 is not particularly limited. A wood grain pattern, stone grain pattern, cloth-textured pattern, abstract pattern, geometrical pattern, letter, symbol and the like, or any combinations of these patterns may be used as desired. The liquid repellent mat pattern 33 is formed, at the portion where real-material-like appearance by matting is desired or at the portion to be expressed as the visually recessed portion, in the desired design pattern. As one example of the portion where real-material-like appearance by matting is desired, spring-wood portion (in contrast with glossy autumn-wood portion) in the wood grain pattern may be raised. As one example of the portion to be expressed as the visually recessed portion, the portion which represent vessel pores in the wood grain pattern may be raised. The liquid repellent mat pattern 33 may be colorless. However, it is preferable that the liquid repellent mat pattern 33 have colored patterns, in terms of obtaining a good effect of aligning the color pattern with the visual raised/recessed pattern.

The type of the ink for forming the liquid repellent mat pattern 33 is not particularly limited. The ink used for the liquid repellent mat pattern 33 may be the same type as or different from the printing ink used for the ordinary pattern 32. It should be noted that, the ink for the liquid repellent mat pattern 33 contains a liquid repellent binder resin or an appropriate liquid repellent agent added thereto.

Examples of the liquid repellent binder resin include a silicone based resin or a fluorocarbon based resin. Substances having a relatively low surface tension including a paraffin such as polyethylene wax, an aliphatic acid or a derivative thereof, a metallic soap, a silicone based compound and a fluorocarbon based compound can be used, for example, as the liquid repellent agent. Among them, the liquid repellent agent containing the silicone base compound or the fluorocarbon based compound is the most excellent in terms of the liquid repellent effect.

An appropriate matting agent is added to the printing ink used for forming the liquid repellent mat pattern 33, so that a desired mat state of surface is obtained on the surface of the ink layer after printing. As such a matting agent, inorganic powder materials such as silica, alumina, calcium carbonate, barium sulfate, glass powder, talc, clay, diatomaceous earth, Shirasu balloon or synthetic resin beads may be used. The particle diameter of such powder may be selected according to the desired degree of mat appearance. The average particle diameter of such powder is most commonly set within a range of 0.5 to 50 $\mu$m or so.

The liquid repellent mat pattern 33 is a layer which is exposed at the surface of the thermosetting resin decorative board as the final product, without being protected by the covering layer 34 of the impregnated resin. Therefore, in terms of mechanical and chemical surface properties of the decorative board, it is desirable that the liquid repellent mat pattern 33 is formed by a printing ink which contains, as a binder, a curable resin such as a thermosetting resin or a ionizing radiation curable resin. In such a structure, the surface of the liquid repellent mat pattern 33 is not likely to be planished and lose the mat appearance by the action of heat and pressure during the hot-pressing process. Accordingly, a thermosetting resin decorative board, which is excellent in texture and visual three-dimensional appearance due to sufficient difference in glossiness, can be reliably produced, which is quite advantageous.

Examples of such a curable resin include thermosetting resins such as melamine based, epoxy based, urea based, phenol based, unsaturated polyester based, diarylphthalate based, benzoguanamine based, urethane based, amino alkyd based and silicone based resins; and ionizing radiation curable resins such as (meth)acrylate based, unsaturated polyester based resins.

The type of the design patterns of the liquid repellent mat pattern 33 is not particularly limited. In other words, the design pattern of the liquid repellent mat pattern 33 may be aligned or may not be aligned with that of the ordinary pattern 32. However, in general, a thermosetting resin decorative board having more excellent design properties can be obtained by aligning the design pattern of the liquid repellent mat pattern 33 with that of the ordinary pattern 32.

Next, a specific example of the third embodiment will be described hereinafter.

The liquid repellent mat pattern is formed by preparing a titania-containing paper for decorative purposes having excellent water absorbing properties and a basis weight of 100 g/m$^2$; printing a wood grain pattern on the titania-containing paper, by using an water-based ink containing casein as a main component, according to the direct gravure printing method; and forming, by printing "in-line", the liquid repellent mat pattern such that the pattern has a vessel pore pattern (the vessel pore pattern is aligned with the wood grain pattern), according to the direct gravure printing method and using a curable-type urethane resin-based ink to which a silicone-based liquid repellent agent and a silica-based matting agent had been added.

Thereafter, the product is dipped in an aqueous solution of melamine-based resin having a characteristic of being repelled by the liquid repellent mat pattern, so that the product is impregnated with the solution of melamine-based resin. The covering layer of the impregnated resin on the liquid repellent mat pattern is thoroughly repelled. The product is then thoroughly dried. During the aforementioned process, the impregnated amount of the resin is adjusted such that the basis weight of the resin-impregnated patterned paper after the impregnating and drying processes is 200 g/m$^2$.

The obtained resin-impregnated patterned paper is set on a substrate (particle board having 5 mm thickness) with a core paper (phenol resin-impregnated kraft paper) interposed therebetween. A mirror-surface plate is then attached to the surface of the resin-impregnated patterned paper and a hot-pressing process is performed, so that the impregnated resin is cured and a thermosetting resin decorative board of the present embodiment is obtained.

As described above, in the present embodiment, the mat pattern 33 on the surface of the thermosetting resin-impregnated paper 35 is the liquid repellent mat pattern. Due to this, in the hot-pressing process, if the thermosetting resin, which has been impregnated in the base paper 31 that constitutes the thermosetting resin-impregnated paper 35, has melted by being heated and bleeds out to the surface of the base paper 31, the molten thermosetting resin cannot enter the clearance between the liquid repellent mat pattern 33 and the mirror-surface plate 38 because the melted resin is repelled by the liquid repellent mat pattern 33. Accordingly, the covering layer of the impregnated resin is not formed on the liquid repellent mat pattern 33, thereby preventing the excellent mat appearance of the liquid repellent mat pattern 33 from being degraded by the formation of the covering layer 34 of the impregnated resin. That is, the present embodiment achieves an excellent effect by which a thermosetting resin decorative board, which is excellent in the texture, real material (wood, marble etc.)-like appearance, visual three-dimensional appearance (such excellent appearance results from sufficient difference in gloss between the liquid repellent mat pattern 33 and other portion) and thus has excellent design properties, can be easily obtained.

The thermosetting resin-impregnated paper 35 is produced by first forming the liquid repellent mat pattern 33 on the base paper 31 having excellent water absorbing properties and then impregnating the base paper 31 with the thermosetting resin which is repelled by the liquid repellent mat pattern 33, thereby forming the thermosetting resin-impregnated pattern at least on the surface of the thermosetting resin-impregnated paper 35. In other words, the liquid repellent mat pattern 33 is provided directly on the base paper 31 without having the cover layer 34 of the thermosetting resin for impregnation (which exhibits poor affinity with the liquid repellent mat pattern 33) interposed between the pattern 33 and the base paper 31. Therefore, excellent adhering properties can be reliably obtained between the base paper 31 and the liquid repellent mat pattern 33. Further, according to the resin-impregnation process of the present embodiment, as the impregnated resin is repelled by the liquid repellent mat pattern 33, the covering layer 34 of the impregnated resin is not formed on the liquid repellent mat pattern 33. In short, according to the present embodiment, an excellent effect is achieved by which a thermosetting resin decorative board, which is excellent in texture and the like and thus has excellent design properties, can be easily obtained.

Fourth Embodiment

Figure 6:
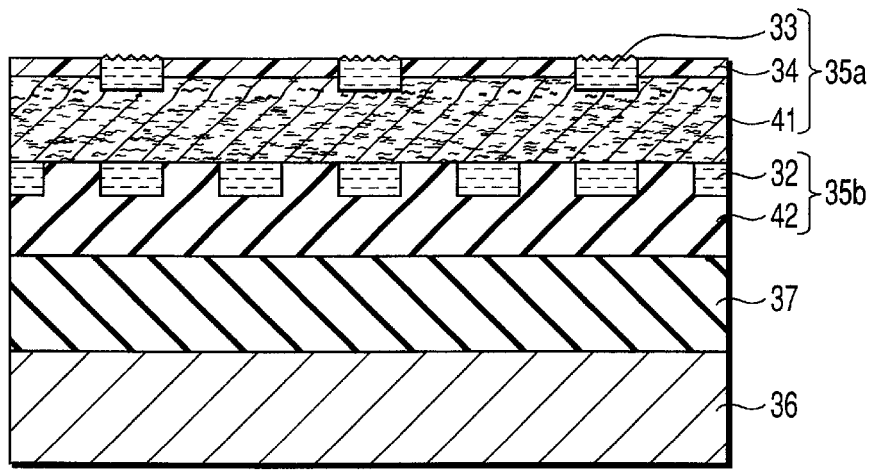
FIG. 6 is a side sectional view showing a fourth embodiment of a thermosetting resin decorative board of the present invention.

According to the fourth embodiment shown in FIG. 6, a sheet of the resin-impregnated patterned paper 35 of the third embodiment is divided into a surface resin-impregnated patterned paper 35a produced by first forming the liquid repellent mat pattern 33 on a transparent paper 41 as base paper having a characteristic of becoming transparent when being impregnated with a resin, and then impregnating the base paper with the thermosetting resin; and an intermediate resin-impregnated patterned paper 35b produced by first forming the ordinary pattern 32 on an ordinary base paper 42 and then impregnating the base paper with the thermosetting resin. The intermediate resin-impregnated patterned paper 35b and the surface resin-impregnated patterned paper 35a are sequently provided on the core paper 37 which is set on the substrate 36.

In the structure of the present embodiment, as the ordinary pattern 32 are separated from the liquid repellent mat pattern 33 by way of the transparent paper 41, the ordinary pattern 32 and the liquid repellent mat pattern 33 look different depending on the height and angle at which a user sees the product (in other words, depending on the positional relationship between the ordinary pattern 32 and the liquid repellent mat pattern 33 which varies according to the height and angle at which a user sees the product). Accordingly, in the present embodiment, a thermosetting resin decorative board having excellent thick appearance and three-dimensional appearance (that is, a thermosetting resin decorative board which is excellent in design properties) can be obtained.

Fifth Embodiment

Figure 7:
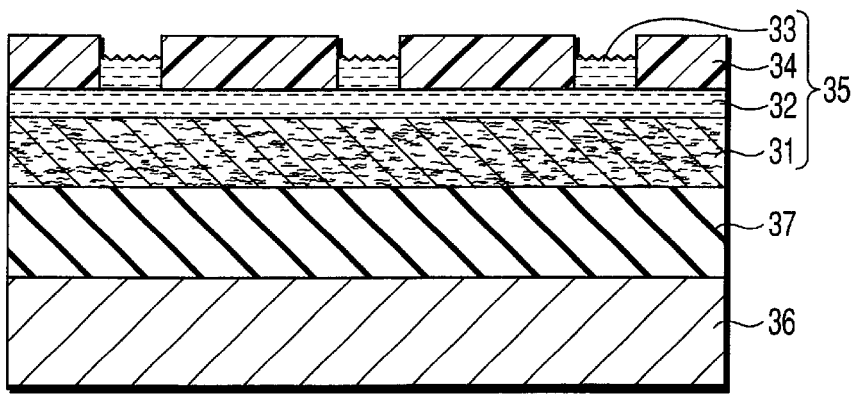
FIG. 7 is a side sectional view showing a fifth embodiment of a thermosetting resin decorative board of the present invention.

FIG. 7 shows a fifth embodiment in which the idea of the third embodiment is combined with that of the first embodiment. In the third embodiment shown in FIG. 4, a scale relationship with respect to thickness is not specified between the ink film thickness of the liquid repellent mat pattern 33 and thickness of the covering layer 34, of the impregnated resin. However, in the fifth embodiment, the liquid repellent mat pattern 33 is formed so as to have a significantly thin ink film thickness, and in the resin impregnating process thereafter, the covering layer 34 of the impregnated resin whose thickness is thicker than the film thickness of the liquid repellent mat pattern 33 is formed, on the surface of the base paper 31, at the portions other than the portions where the liquid repellent mat pattern 33 is formed. As a result, recessed portion is created at the portion where the liquid repellent mat pattern 33 is formed. By carrying out the hot-pressing process while maintaining the configuration of the recessed portion, a thermosetting resin decorative board, which has the recessed portion aligned with the portion where the liquid repellent mat pattern 33 is formed, can be obtained. The thermosetting resin decorative board having such a structure exhibits excellently three-dimensional design appearance, due to the-raised/recessed surface configuration which is aligned with changes in gloss.

Sixth Embodiment

Figure 8:
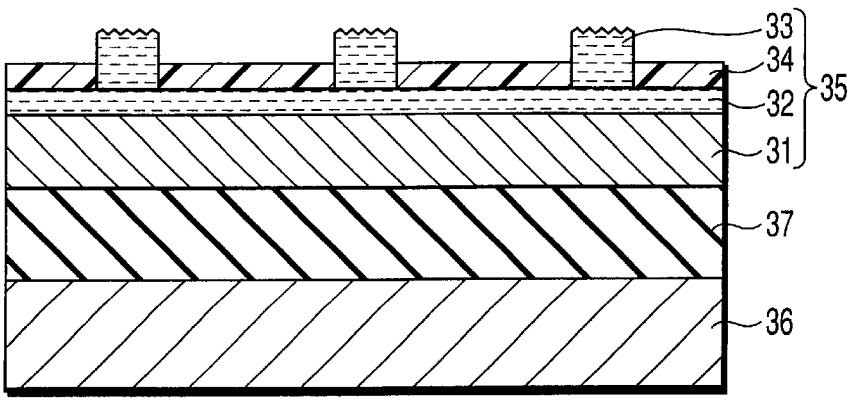
FIG. 8 is a side sectional view showing a sixth embodiment of a thermosetting resin decorative board of the present invention.

FIG. 8 shows a sixth embodiment which has an idea opposite to that of the fifth embodiment. In the sixth embodiment, the liquid repellent mat pattern 33 are formed so as to have a significantly thick ink film thickness, and in the resin impregnating process thereafter, the covering layer 34 of the impregnated resin whose thickness is thinner than the film thickness of the liquid repellent mat pattern 33 is formed, on the surface of the base paper 31, at the portions other than the portions where the liquid repellent mat pattern 33 is formed. As a result, a thermosetting resin decorative board, in which the mat portion is raised portion, can be obtained. In this case, if a hard material like the metal plate (mirror-surface plate) 38 is directly attached for molding to the surface of the resin-impregnated patterned paper 35 during the hot-pressing process, the liquid repellent mat pattern 33 is buried into the base paper 31 due to the molding pressure, and the resulting surface configuration will not be so different from that shown in FIG. 4. Therefore, in the present embodiment, it is preferable to perform the hot-pressing process with a heat-elastic resilient material (such as a silicone rubber plate) interposed between the resin-impregnated patterned paper 35 and the metal plate (mirror-surface plate) 38.

Additional advantages and modifications will readily occur to.those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the aforementioned embodiments (described separately) may be combined in an appropriate manner. Specifically, in the third embodiment shown in FIG. 4 or in the fourth embodiment shown in FIG. 6, the thickness of the liquid repellent mat pattern 33 and the covering layer 34 of the impregnated resin may be changed as shown in FIG. 7 or FIG. 8.

As described above, according to the present invention, the liquid repellent pattern and the covering layer of the impregnated resin are formed on the surface of the thermosetting resin-impregnated sheet, such that the covering layer of the impregnated resin is thicker than the liquid repellent pattern. Therefore, a thermosetting resin decorative board which has a recessed portion aligned with the design pattern and thus is excellent in design properties can be obtained.

Further, according to the present invention, the mat pattern having liquid repellency properties and the covering layer of the impregnated resin having gloss are provided on the surface of the thermosetting resin-impregnated sheet. Therefore, the gloss-mat effect by the mat pattern is not reduced by the hot-pressing, and a thermosetting resin decorative board which has excellent texture, due to sufficient difference in gloss can be provided.

Further, according to the present invention, the liquid repellent pattern is formed on the surface of the base paper having excellent water absorbing properties and then the base paper is impregnated with the thermosetting resin which is repelled by the liquid repellent pattern. As a result, the resin-impregnated patterned sheet is produced. In this resin-impregnated patterned sheet, the covering layer of the impregnated resin is formed, on the base paper, at the portions other than the portions where the liquid repellent pattern is formed, so as to be thicker than the liquid repellent pattern (and the recessed portion is created at the liquid repellent pattern portion). The resin-impregnated patterned sheet is set on the base paper and the hot-pressing process is carried out while maintaining the configuration of the recessed portion. Due to this, a thermosetting resin decorative board, which has a recessed portion aligned with the design pattern and thus is excellent in design properties, can be easily and efficiently produced at a relatively low production cost.

Further, according to the present invention, the mat pattern having liquid repellency is formed on the surface of the base paper having excellent water absorbing properties and then the base paper is impregnated with the thermosetting resin which is repelled by the liquid repellent mat pattern. As a result, the resin-impregnated patterned sheet is produced. In this resin-impregnated patterned sheet, the covering layer of the impregnated resin is formed, on the base paper, at the portions other than the portions where the liquid repellent mat pattern is formed. The resin-impregnated patterned sheet is then subjected to the hot-pressing process. Due to this, the mat effect by the mat pattern is not reduced by the hot-pressing, and a thermosetting resin decorative board which has excellent texture due to sufficient difference in gloss can be provided.

What is claimed is:

1. A thermosetting resin decorative board comprising:
   a thermosetting resin-impregnated sheet; and
   a liquid repellent pattern and a covering layer of the impregnated resin which are formed on said thermosetting resin-impregnated sheet such that the covering layer is not formed on the liquid repellent pattern, wherein said covering layer of the impregnated resin is thicker than said liquid repellent pattern,
   wherein the surface of the liquid repellent pattern is recessed as compared with the surface of the covering layer of the impregnated resin.

2. A thermosetting resin decorative board comprising:
   a thermosetting resin-impregnated sheet having a non-liquid-repellent pattern;
   a thermosetting resin-impregnated transparent sheet which is formed on said thermosetting resin-impregnated sheet; and
   a liquid repellent pattern and a covering layer of the impregnated resin which are formed on said thermosetting resin-impregnated transparent sheet such that the covering layer is not formed on the liquid repellent mat pattern, wherein said covering layer of the impregnated resin is thicker than said liquid repellent pattern,
   wherein the surface of the liquid repellent pattern is recessed as compared with the surface of the covering layer of the impregnated resin.

3. A thermosetting resin decorative board comprising:
   a thermosetting resin-impregnated sheet; and
   a liquid repellent mat pattern and a glossy covering layer of the impregnated resin which are formed on said thermosetting resin-impregnated sheet such that the covering layer is not formed on the liquid repellent mat pattern wherein said glossy covering layer of the impregnated resin is thicker than said liquid repellent mat pattern,
   wherein the surface of the liquid repellent pattern is recessed as compared with the surface of the covering layer of the impregnated resin.

4. The thermosetting resin decorative board according to claim 3, further comprising a non-liquid-repellent pattern formed on said thermosetting resin-impregnated sheet, wherein said non-liquid-repellent pattern is covered by said covering layer of the impregnated resin.

5. A thermosetting resin decorative board comprising:
   a thermosetting resin-impregnated sheet having a non-liquid repellent pattern;
   a thermosetting resin-impregnated transparent sheet which is formed on said thermosetting resin-impregnated sheet; and
   a liquid repellent mat pattern and a glossy covering layer of the impregnated resin which are formed on said thermosetting resin-impregnated transparent sheet such that the covering layer is not formed on the liquid repellent mat pattern wherein said glossy covering layer of the impregnated resin is thicker than said liquid repellent mat pattern, wherein the surface of the liquid repellent pattern is recessed as compared with the surface of the covering layer of the impregnated resin.

6. The thermosetting resin decorative board according to claim 1, wherein said covering layer is formed by impregnating the thermosetting resin-impregnated sheet having a liquid repellent pattern with a thermosetting resin having a characteristic of being repelled by the liquid repellent pattern and the thermosetting resin decorative board is formed by hot pressing the impregnated thermosetting resin-impregnated sheet set on a substrate.

7. The thermosetting resin decorative board according to claim 6, further comprising a non-liquid-repellent pattern formed on said thermosetting resin-impregnated sheet, wherein said non-liquid-repellent pattern is covered by said covering layer of the impregnated resin.

8. The thermosetting resin decorative board according to claim 2, wherein said covering layer is formed by impregnating the thermosetting resin-impregnated sheet having a liquid repellent pattern with a thermosetting resin having a characteristic of being repelled by the liquid repellent pattern and the thermosetting resin decorative board is formed by hot pressing the impregnated thermosetting resin-impregnated sheet set on a substrate.

9. The thermosetting resin decorative board according to claim 3, wherein said covering layer is formed by impregnating the thermosetting resin-impregnated sheet having a liquid repellent mat pattern with a thermosetting resin having a characteristic of being repelled by the liquid repellent mat pattern and the thermosetting resin decorative board is formed by hot pressing the impregnated thermosetting resin-impregnated sheet set on a substrate.

10. The thermosetting resin decorative board according to claim 5, wherein said covering layer is formed by impregnating the thermosetting resin-impregnated sheet having a liquid repellent mat pattern with a thermosetting resin having a characteristic of being repelled by the liquid repellent mat pattern and the thermosetting resin decorative board is formed by hot pressing the impregnated thermosetting resin-impregnated sheet set on a substrate.

* * * * *